March 22, 1932.  J. W. LAMBERT  1,850,588
WHEEL
Original Filed May 13, 1927   2 Sheets-Sheet 1

Inventor
John W. Lambert
By his Attorney

March 22, 1932.  J. W. LAMBERT  1,850,588
WHEEL
Original Filed May 13, 1927  2 Sheets-Sheet 2

Inventor
John W. Lambert
By his Attorney

Patented Mar. 22, 1932

1,850,588

UNITED STATES PATENT OFFICE

JOHN W. LAMBERT, OF PHILADELPHIA, PENNSYLVANIA, ASSIGNOR, BY MESNE ASSIGNMENTS, TO BURNETT WALKER, OF NEW YORK, N. Y.

WHEEL

Application filed May 13, 1927, Serial No. 190,995. Renewed July 7, 1931.

This invention relates to improvements in wheels such as are made of metal and provided with pneumatic tires for use on automobiles, and more particularly to the type known as dual-tire wheels for buses and trucks.

An object of the invention is to provide a highly efficient self-cooling wheel consisting of means for rapidly circulating air currents about the brake drum and tire supporting structure when the wheel is revolving in a forward direction, dissipating the usual heat generated as the machine travels, the hot air being quickly displaced by forced currents of entering cold air. This results primarily in prolonging the life of the inside tire which in the past has given comparatively low mileage. The wheel is designed not only to set up air currents but is further provided with supplementary means for deflecting air to set up positive currents when the vehicle is in motion.

The structure of the wheel in general is similar to that shown in co-pending application filed by A. R. Lambert on April 22, 1926, Serial Number 103,868, but this invention contemplates particularly the provision of a stationary fan-like structure that acts as a positive means to continuously displace air in any suitable direction during forward movement of the vehicle carrying the wheel.

The latter is so mounted and counterweighted as not to partake of any of the rotary motion of the wheel structure supporting it but its several blades are inclined at angles suitable to deflect air contacting with them. In the embodiment illustrated the blades are shaped to set up currents axially through openings in the wheel structure. These currents help to cool the wheel and reduce the amount of heat transmitted to the tire, thereby lowering its temperature and prolonging its life.

The stationary deflector could of course be placed on any type of wheel, but it is particularly useful on the dual wheel illustrated, which carries a plurality of radially extending blades carried by the body of the wheel about the hub and between the two wheels, which blades tend to set up certain currents, some of which flow radially between the wheels. The stationary deflector sets up additional currents flowing outwardly through the outside wheel and diverts some of the currents set up by the inner radial fan. There is a tendency for the heated air to simply whirl around and be sucked after the wheel, and the stationary deflector sets up a current that draws the heated air away from the wheel and throws it outwardly into the stream of cold air rushing past the outside of the wheel.

Further objects of the invention include mechanical details of construction to provide improvements embodying compactness, accessibility, and a relatively light and yet extremely rigid structure. Effective means are provided for securing the wheel to the axle and for mounting and retaining the stationary fan structure in a protected position upon the wheel hub.

In the drawings forming a part of this specification:

Figure 1:
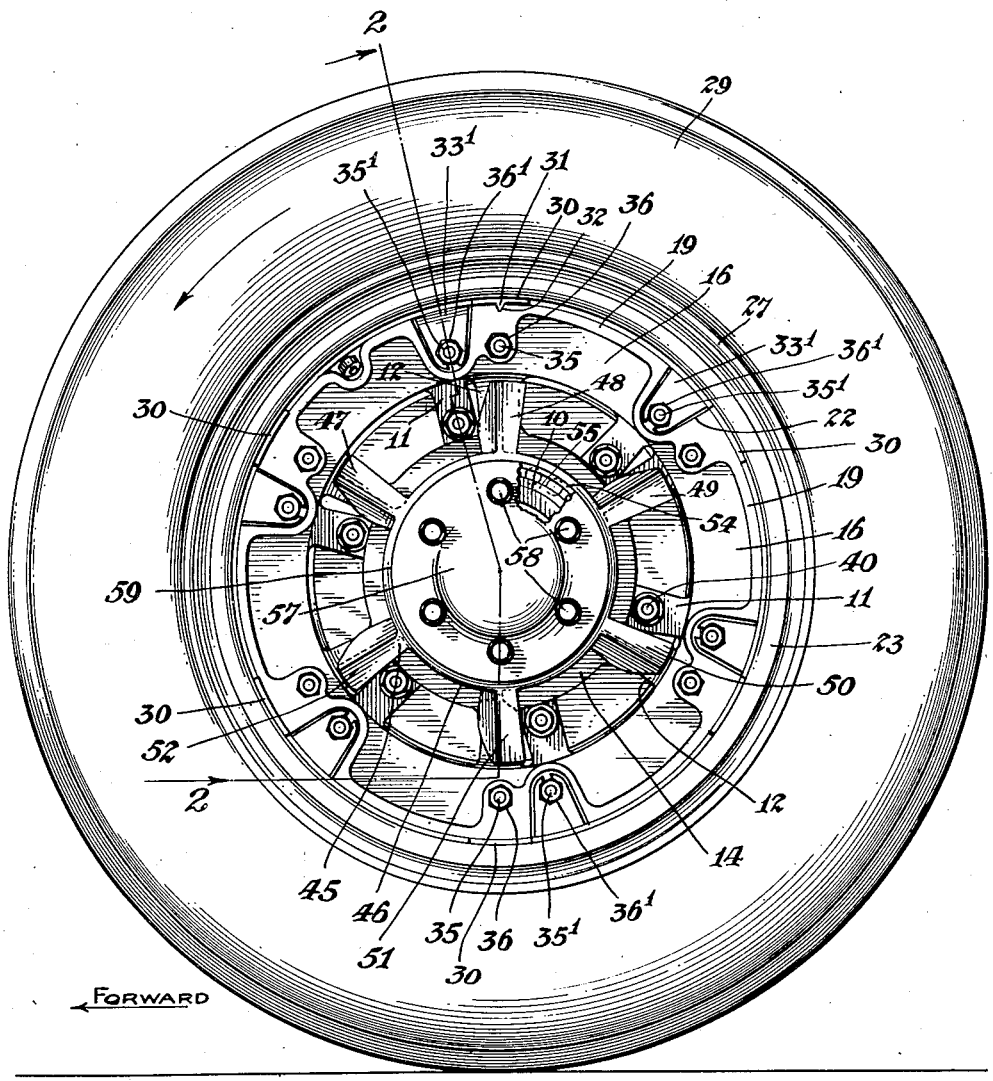
Figure 1 is an outside elevation of my improved dual-tire wheel embodying a preferred form of the invention.
Figure 2:
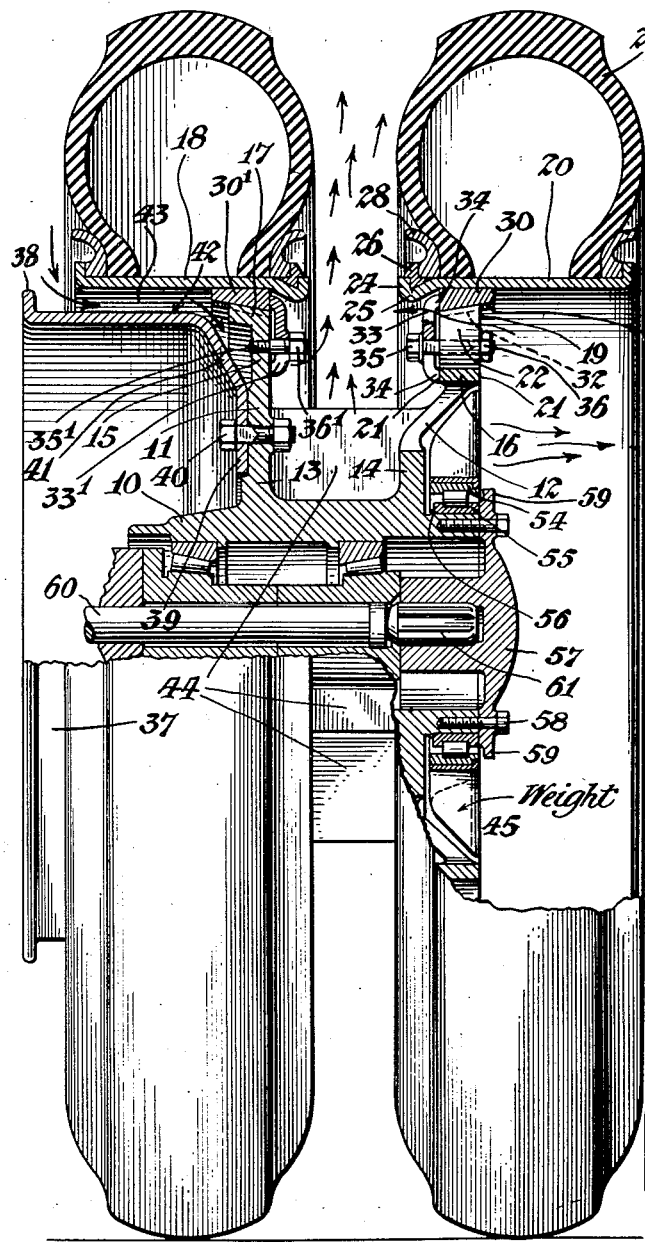
Figure 2 is an end elevation, partly in section, as indicated on the line 2—2 of Figure 1.

The body portion of the wheel consists of a hub 10 with two sets of flat spokes 11 and 12, preferably cast integral with the hub and radiating from flanges 13 and 14 formed on the hub 10. The spokes of one set are staggered with respect to those of the other set to an extent equal approximately to the width of one of the spokes and are connected at their outer ends by continuous annular webs 15 and 16 respectively. Web 15 terminates in a direction away from the center of the wheel, in a narrow annular flange 17 the periphery of which is of frusto-conical configuration. Upon this flange is supported the inner demountable tire rim 18. Web 16 also terminates similarly in a flange 19 with a frusto-conical configuration but in reverse relation to flange 17 and supports the outer demountable tire rim 20. The spokes of the inner set 11 lie in a vertical plane but those of the outer set 12 are inclined outwardly, the flange 14 from which they radiate being set back, the purpose of which will presently appear. Web 16 is provided with a series of oppositely arranged bosses 21 projecting from each side flush with the edges of flange 19 and through these bosses are U-shaped openings 22 extending transversely across their entire width and radially through the flange 19.

The rim 20 is of well known standard construction having the usual terminal flanges 23 and 24 with a depressed channel 25 to receive a locking ring 26 adapted to cooperate with rings 27 and 28 which engage the shoe 29 of the tire and demountably secure same to the rim 20 in a well known manner, the inner tubes of both tire shoes being omitted in the drawings.

Permanently secured to the rim 20 is a series of wedge-shaped blocks 30 one of which is provided with a rib 31 which anchors the rim to the body of the wheel to prevent creepage of the rim relative to the wheel body. The axial taper which gives the blocks their wedge-shape character corresponds to the angular configuration of the flange 19, the latter being also provided with a transverse groove 32 to receive the rib 31. The rim 20 is secured to the body of the wheel by means of a series of clamps 33 having ends 34 slightly projecting at right angles to engage the inner surfaces of the blocks 30 at one end of the clamp and the inner surface of the bosses 21 on flange 19 at the other end. The clamps 33 are slotted to receive bolts 35 which pass through them and through the bosses so that when the nuts 36 are tightened the blocks 30 will be forced into the wedge of the opposing angle of the flange and the rim 20 will be securely locked to the body portion of the wheel. The clamps 33 lie close enough to the rim 20 to prevent them from turning when tightened and the shanks of the bolts 35 are square throughout a suitable portion of their length so that they will not turn in the broached holes through the bosses 21.

It will be now obvious that in order to mount the rim 20 on the flange 19, from the outside of the wheel inwardly, the blocks 30 must first be passed inwardly through and beyond the flange, hence the openings 22 which are of sufficient size for this purpose, the rim 20 being subsequently given a partial rotation until the blocks are clear of the openings, followed by the registration of rib 31 with groove 32 and the final tightening of the clamps 33.

Rim 18 is precisely the same as rim 20 but in reverse relation thereto, and is secured to the flange 17 in a similar manner save for the partial rotation, the wedge-shaped blocks 30' being first passed through the openings 22 in the outer flange 19. The clamps 33' are tightened by nuts 36' which screw onto studs 35' permanently attached to inner rim 15 in line with the openings 22 so that the nuts 36' are readily accessible for final tightening.

It will be understood that the inner rim 18 is mounted prior to the outer rim 20 and that one of its blocks 30' is also provided with a rib similar to rib 31 and cooperating with a groove in flange 17 similar to the groove 32.

Due to the exact similarity of the rims 18 and 20 and their respective blocks 30, together with the flanges 17 and 19, the rims may be interchangeably mounted on either flange.

As this dual wheel is primarily adapted for use as the rear wheel of a bus or truck, it is necessary to accommodate the brake drum on the inner side of the inner wheel. The vehicle manufacturers use various types of brake drums, and it is necessary to build the wheel with proportions to suit the drum of the particular vehicle. The brake drum illustrated at 37 has an annular flange 38 at its inner end and an angular wall 41 carrying an annular flange 39 at its outer end. The drum is secured to the spokes 11 by bolts 40 which have squared shanks and pass through broached holes in the flange 39.

During the operation of the vehicle the repeated use of the brakes causes the brake drum to get very hot, and in an all-metal wheel some of this heat is conducted through the spokes and the rims to the inner tire. This excessive heating of the tire causes its rapid deterioration and greatly reduces its life.

In the wheel illustrated herein the tire rim is spaced from the brake drum, and the open spokes of the wheel permit air to circulate freely about the brake drum. In order to positively circulate air through these spaces a series of impeller blades 44 are disposed radially about hub 10 and are preferably cast integral with the hub 10 and with spokes 12. These blades constitute a centrifugal fan which sets up currents of air passing radially outward between the wheels, thereby drawing cold air inwardly through space 43 between the brake drum and the wheel rim 18, and through the spaces below rim 20.

Figure 3:
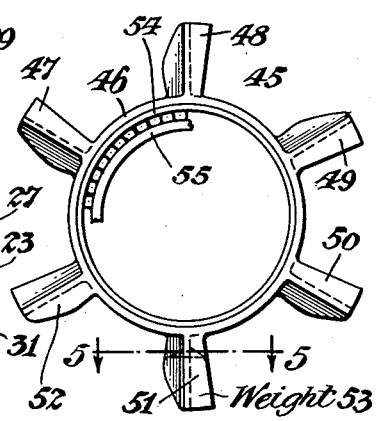
Figure 3 is a detail side elevation of the stationary fan structure removed from the wheel.
Figure 4:
Figure 4 is a top plan view of Figure 3.
Figure 5:
Figure 5 is an enlarged detail section on the line 5—5 of Figure 3.

As an additional positive means for creating cooling currents of air, the invention provides a deflector member journaled on the hub of the wheel in such a manner as to remain non-rotary during movement of the wheel. In the embodiment illustrated the deflector fan 45 consists of a ring 46 having six blades, 47, 48, 49, 50, 51, and 52 radiating therefrom. Looking at Fig. 3, the deflector shown is adapted to be mounted on the left side of a vehicle and the deflector is therefore carried toward the left of Fig. 3 during the forward movement of the vehicle as indicated by the arrows of Fig. 4. As illustrated, the forward or leading edge of each blade is inclined inwardly, thereby tending to divert air outwardly through the wheel. The ring 46 is mounted with a drive fit on the outer ring 54 of an annular roller bearing, the inner ring 55 of which is forced over the hub 10 into contact with shoulder 56 and revolves with the hub. Hub cap 57 is secured to the end of the hub 10 by the bolts 58, its flange 51 extending beyond the hub to protect the bearing.

The action of the air on the upper blades is balanced by its action on the lower blades, so that there is no tendency for the air to rotate the deflector, and a weight 53 attached to the lower blade 51 overcomes any tendency of the friction in the bearing to rotate the deflector fan.

It will be clear that the slope of the blades will be reversed in the deflector for use on the right-hand side of the vehicle.

The blades on the non-rotary deflector could be mounted in any desired position, and could be made to deflect the air in any direction to produce the best results under the particular conditions.

Figure 6:
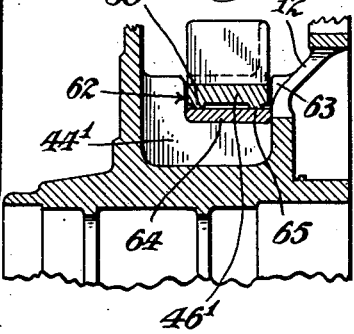
Figure 6 is a sectional fragmentary view of the wheel hub showing a modified form and application of the stationary fan structure.

In the modified form of construction shown in Figure 6 the fan structure which is generally similar to structure 45, is shown mounted within the field of the centrifugal hub fan, the outer ends of the blades 44' of which are cut away for a portion of their axial length to form shoulders 62 between which and bosses 63 formed on the spokes 12 is mounted a split ring 64 to provide a bearing surface for annular ribs 65 on the inner surface of the ring 46' of the fan structure. The structure itself is also of split formation, the halves of each of these elements being secured together in a well known manner and not illustrated in the drawings. In the modified form of the invention the blades of the fan structure are precisely the same as those of the preferred form with the weighted one pendant, the fan structure moving along with the wheel without revolving and a portion of the heated air being diverted axially as previously described.

While the non-rotative deflector cooperates in a particular manner with the dual wheel illustrated herein, it should be understood that its use is not so limited, and that it could be used on any wheel where it was found desirable to set up positive air currents to cool the wheel structure and reduce the amount of heat radiated to the tire or tires.

I claim:

1. A vehicle wheel comprising a hub, and an air deflector non-rotatably mounted on the hub and adapted to set up air currents to cool the wheel during forward movement of the vehicle.

2. A vehicle wheel comprising a hub, a member non-rotatably mounted on the hub, and a blade carried by said member, said blade having a portion disposed at an angle to the line of movement of the vehicle to thereby set up air currents about the wheel during forward movement of the vehicle.

3. In combination, a vehicle wheel adapted to rotate during forward motion of the vehicle, and a deflector supported from the vehicle and adapted to remain substantially non-rotative to set up air currents to cool the wheel during forward movement of the vehicle.

4. In combination, a vehicle wheel adapted to rotate during forward motion of the vehicle, a deflector supported from the vehicle and adapted to remain substantially non-rotative, and a deflector surface carried by said deflector, said deflector surface being disposed at an angle to the line of movement of the vehicle to thereby set up air currents about the wheel during forward movement of the vehicle.

5. An air-cooled wheel comprising a body portion, a tire-carrying rim, and a non-rotating fan structure consisting of a series of blades angularly disposed to set up air currents about the wheel when it is moving in a forward direction.

6. A fan structure for air-cooling metal wheels comprising a ring provided with an anti-friction annular bearing adapted to surround the hub of said wheel and support the fan structure thereon, and a plurality of radially extending blades arranged in a plane at right angles to the axis of said hub, the leading edges of said blades with respect to the forward direction of wheel travel being angularly disposed to set up air currents during such wheel travel, and weighted means adapted to arrest rotation of said blades when the hub of said wheel is revolving.

7. In combination with a wheel, an air-circulating or deflecting device mounted on the wheel and revoluble in relation thereto, said device including air-deflecting blades, and means preventing rotation of said device in relation to the structure in which the wheel is located.

8. In combination with a wheel, an air-circulating or deflecting device mounted on the wheel and revoluble in relation thereto, said device including air-deflecting blades, and a weight on said device preventing rotation thereof in relation to the structure in which the wheel is located.

9. In combination with a wheel, an air-circulating or deflecting device mounted on the wheel and revoluble in relation thereto, said device including generally radial blades angularly arranged with respect to radial axial planes, and means preventing rotation of said device in respect to the structure in which the wheel is located.

10. In combination with a wheel, an air-circulating or deflecting device mounted on the wheel and revoluble in relation thereto, said device including generally radial blades angularly arranged with respect to radial axial planes, blades above and below the axis being oppositely angularly directed, whereby reaction of air against them does not tend to cause rotation of the device.

11. In combination with a wheel, an annular air-deflector revolubly mounted on the wheel hub concentric with the wheel axis, said device including generally radial air-deflecting blades, and means preventing rotation of said device.

12. In combination with a wheel, an annular air-deflector revolubly mounted on the wheel hub concentric with the wheel axis, said device including generally radial air-deflecting blades, and a weight at one side of the device which normally remains in position below the wheel axis and prevents rotation of the device.

In testimony whereof I affix my signature.

JOHN W. LAMBERT.